United States Patent
Farnworth

[15] 3,695,007
[45] Oct. 3, 1972

[54] APPARATUS FOR REMOVING PARTICULATE MATERIAL FROM GASES

[72] Inventor: Wilfred Farnworth, North Vancouver, British Columbia, Canada

[73] Assignee: Rader Pneumatics Incorporated, Portland, Oreg.

[22] Filed: Aug. 14, 1970

[21] Appl. No.: 63,772

[52] U.S. Cl. ...................55/294, 55/302, 55/337, 55/341
[51] Int. Cl. ............................................B01d 46/04
[58] Field of Search.................55/294, 302, 337, 341

[56] References Cited

UNITED STATES PATENTS 2,391,534   12/1945   Yerrick et al.................55/294
3,356,215   12/1967   Miles, Jr......................55/294

FOREIGN PATENTS OR APPLICATIONS 982,212   2/1965   Great Britain...............55/302

*Primary Examiner*—Bernard Nozick
*Attorney*—Buckhorn, Blore, Klarquist and Sparkman

[57] ABSTRACT

Apparatus for removing particulates from gases comprises cyclone separator and tube filter mounted thereover. Baffles are provided to direct air flow from separator to tube filter. Tube filter comprises long porous tubes suspended from plate, latter being divided into sections to facilitate removal for repair of tubes. Backwash device for tubes comprises hollow arm to create air pulses in tubes driven by motor mounted in well of plate.

3 Claims, 3 Drawing Figures

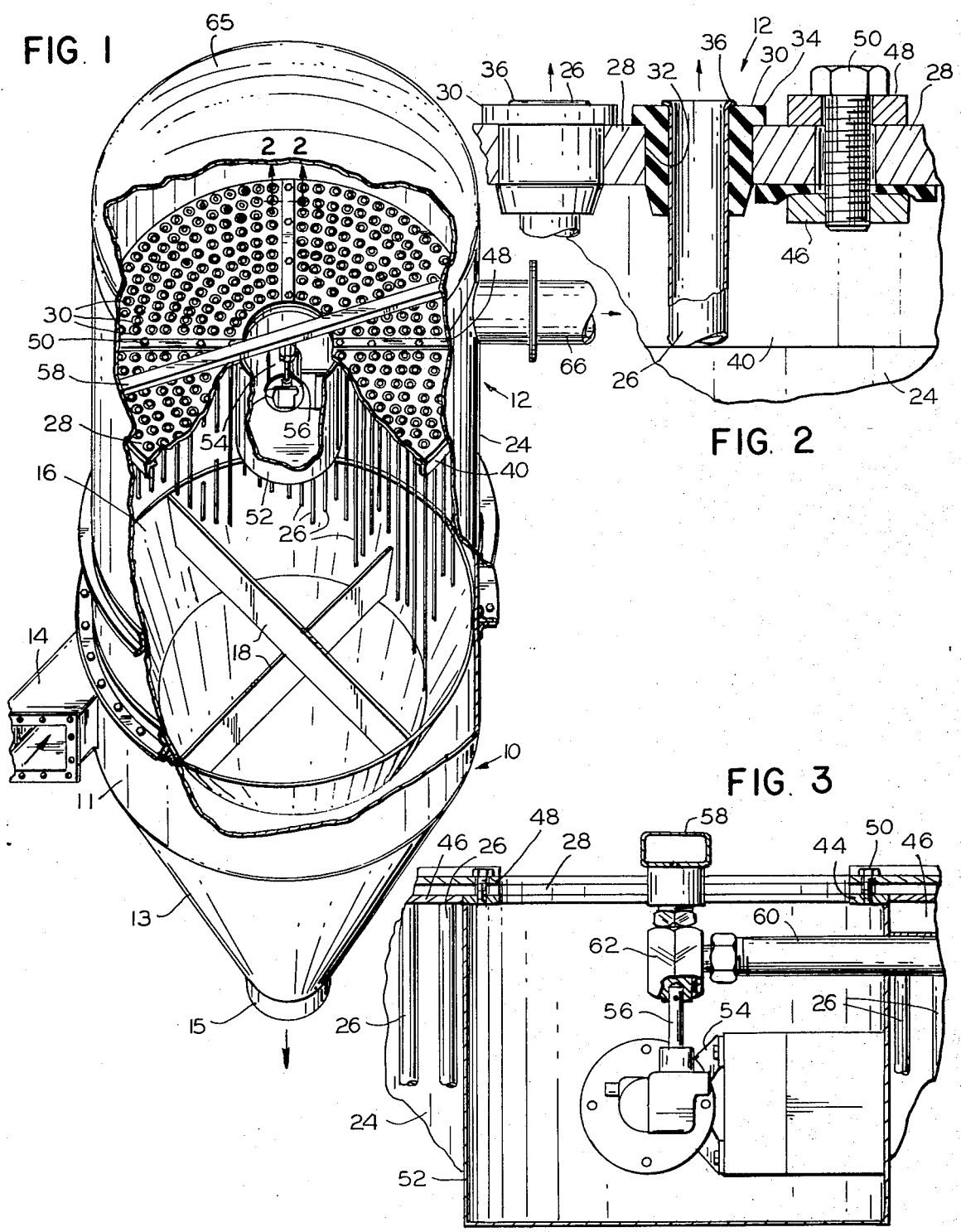

APPARATUS FOR REMOVING PARTICULATE MATERIAL FROM GASES

BACKGROUND OF INVENTION

It has been proposed heretofore to separate solids from gases in filters comprising porous tubular elements formed of porous plastic or metal. Such tubes have been mounted within a chamber into which the solids carrying gas is passed with the interior of the tubes communicating with an exhaust system so as to draw off the clean gas. The solids will collect on the exterior of the tubes, hence, periodically the tubes are cleaned by blowing a jet of air into the open end of the tubes.

SUMMARY OF INVENTION

The present invention comprises certain improvements in porous tube filters of the type described above.

More particularly, the improvements comprise a new and improved arrangement of a small tube filter with a cyclone separator.

Still another improvement resides in a mounting arrangement for such tubes that permits their ready removal in the event of the need for replacement.

Still another improvement resides in an improved arrangement for the mounting of an air cleaning system for the tubes.

Other objects and advantages will appear hereinafter.

The filter of the present invention comprises a base portion including a centrifugal type of separator on the top of which is mounted a chamber having a plurality of long tubes of a porous plastic material. The tubes are suspended from a sectionalized plate which divides the chamber and isolates the bottom portion from the top whereby by connecting the top portion of the chamber to an evacuation system, air may be exhausted from the interior of the tubes through the top whereby the dust carried by the air will be collected on the exterior portions of the tubes suspended beneath the plates. Sectionalizing of the plate permits easier removal of portions of the tubes for replacement or repair.

Mounted to revolve over the top end of the tubes is a hollow arm connected to an air source and perforated so that jets of air may periodically be passed downwardly within the tubes to effect removal of the material collecting on the exterior surfaces of the tubes. The arm is driven by a motor mounted in a well positioned beneath the level of the plates whereby the motor mount provides no interference to the removal of the plates.

A skirt and baffle arrangement is provided in the upper portion of the centrifugal separator to protect the tubes from damage by reason of excessively strong air currents.

For a more detailed description of the invention reference is made to the accompanying drawings and following detailed description.

DRAWING

FIG. 1 is a perspective view of a filter constructed in accordance with the invention with parts broken away to show details thereof;

FIG. 2 is an enlarged sectional view showing details of the mounting arrangements for the tubes and supporting plates therefor; and, FIG. 3 is an enlarged fragmentary sectional view showing details of the arrangements for the mounting of the motor and arm for effecting air backwash.

DETAILED DESCRIPTION

Referring first to FIG. 1, the illustrated embodiment of the invention comprises a structure including a cyclone type separator portion 10 and a tube filter portion 12. The cyclone separator portion 10 includes an upper cylindrical body member 11 and a lower conical body member 13 into which the dust-laden air to be cleansed is introduced through a tangential entry duct 14. Preferably, the cyclone portion 10 is provided with a frustoconical skirt 16, the top portion of which is connected to the wall of the cyclone 10 immediately above the tangential entry 14 so that the dust-laden air is introduced behind the skirt 16. Preferably baffles in the form of plates 18 are mounted in the skirt 16 with their side surfaces extending vertically, their purpose being to break up the swirling action of the air which will be flowing upwardly from the cyclone and to cause the air to be directed substantially straight upwardly. As will be apparent, the cyclone 10 will effect separation from the gas of the heavier particles which are introduced therein.

The tube filter section 12 includes an outer cylindrical housing 24. Supported within the housing 24 are a plurality of tubes 26 closed at their lower ends and open at their tops and which are preferably formed of porous plastic material or other suitable material which will be inert to the gas and materials being handled. The tubes 26 may, for example, be formed by sintering polyvinylchloride particles. While the porosity and pore size of a tube may vary depending upon the nature of the particulate material being separated, the pore size may be of the order of 50 microns.

The tubes 26 are supported from a supporting plate 28. Referring to FIG. 2, the upper ends of the tubes 26 are encased in grommets 30 of rubber or other suitable material fitted in openings 32 in the plate 28. The grommets 30 are provided with flanges 34 to engage the upper surface of the plate 28 and preferably the upper ends of each of the tubes is flared outwardly as indicated at 36. This helps in the retention of the tubes and also provides a further function in that it minimizes the pressure drop at the tube exit, and thus minimizes the energy loss of the exiting gas. The openings 32 are preferably arranged in rows concentric with the axis of the housing 24. The plate 28 is supported on a frame including an outer annular member 40 secured by suitable brackets to the casing 24, an inner annular member 44, and radially extending arms 46 connecting the members 40, 44 and supporting the latter. Preferably the plate 28 is formed in cuneate sections such as the quadrants illustrated with the edges of the quadrants overlying the annular members 40, 44 and the radial members 46. The plate sections are removably clamped in place by hold-down bars 48 and bolts 50 threadedly engaged in the radial members 46. The sectionalization of the plate 28 facilitates removal of a plate section in the event there is necessity for replacement or repair of a tube.

The inner frame member 44 comprises the top portion of a well 52 in which is mounted an electric motor 54 connected to drive through suitable gearing a vertical shaft 56. Mounted on the top of the shaft 56 is a hollow arm 58 having perforations in the bottom thereof. Air from a suitable source (not shown) is introduced to the arm 58 through a pipe 60 and swivel joint 62 surrounding the shaft 56. The perforations in the arm 58 are located so as to cause a jet of air to be propelled into each of the tubes 26 as the arm rotates across their upper ends. The plate 28 and well 52 and mounting structure are arranged so as to seal the space above the plate from the space beneath the plate.

In the embodiment of the invention illustrated the space over the top of the tubes is enclosed by a removable lid 65 and the air or gas passing through the tubes 26 is carried away through a conduit 66 which is connected to a suitable exhaust system (not shown). However, the air may be exhausted from the top portion of the unit in any suitable manner.

In operation, the dust-laden air or gas is introduced into the entry port 14 of the cyclone. The gas will whirl around the lower portion of the cyclone causing some of the heavier particles to fall out and downwardly through the bottom exit 15. The exit 15 is of insufficient capacity to exhaust all of the air therethrough, and thus some will pass upwardly and around the tubes 26 carrying, of course, the smaller dust particles or at least those which are less dense and have greater flotation capabilities. As is mentioned previously, the skirt 16 and the baffles 18 prevent air from swirling around the tubes 26 and disturbing them. The air pressure across the tubes 26 will cause the air to pass through the tubes whereby the finer particles carried by the air will collect upon the exterior surface of the tubes 26, and the air exiting from the top of the interior of the tubes will be clean and free from dust. As the arm 58 rotates, a jet of air is injected into the top portion of each tube 28. This will cause a shock wave to develop within the tube and greater pressure to be created within the tube than on the outside thus causing the collected material on the outside to be blown off or shaken off. The removed material will fall out through the bottom of the cyclone portion 10.

Preferably the cleaning jet of air is controlled as to pressure and period of time so as to leave a predetermined amount of the deposited material on the tubes so as to maximize the filtering efficiency of the tubes.

What is claimed is:

1. Apparatus for removing fine particles from a gas comprising:
    a cyclone portion including an upper cylindrical body portion having a tangential entry for gas therein and a lower conical body portion,
    and a filter portion including a cylindrical housing extending upwardly from said cyclone body portion,
    a horizontal plate mounted in the upper portion of said housing,
    a plurality of filtering tubes supported by said plate and extending downwardly therefrom,
    means defining a well at the center of said plate and beneath the upper surface thereof,
    a motor mounted in said well,
    a shaft extending upwardly from said well and drive means connecting said motor to shaft,
    a hollow arm supported on said shaft above said plate and adapted to rotate over the upper ends of said tubes,
    said arm being perforated in its lower wall,
    and means in said well for feeding air to said arm whereby air will be projected from said perforations into the tops of said tubes as said arm rotates.

2. Apparatus as set forth in claim 1 comprising a frustoconical skirt attached at its upper edge to the top of said cyclone cylindrical body portion.

3. Apparatus as set forth in claim 2 comprising baffle means beneath said tubes for directing gas flow axially of said filter portion housing.

* * * * *